(12) United States Patent
Tracey et al.

(10) Patent No.: US 12,065,246 B2
(45) Date of Patent: Aug. 20, 2024

(54) TROLLEY EXTRACTION DEVICE

(71) Applicant: B/E Aerospace (UK) Limited, Leighton Buzzard (GB)

(72) Inventors: Christopher Lourens Tracey, Biggleswade (GB); Paul Michael O'Brien, Hemel Hempstead (GB)

(73) Assignee: B/E AEROSPACE (UK) LIMITED, Leighton Buzzard (GB)

( * ) Notice: Subject to any disclaimer, the term of this patent is extended or adjusted under 35 U.S.C. 154(b) by 137 days.

(21) Appl. No.: 17/860,500

(22) Filed: Jul. 8, 2022

(65) Prior Publication Data
US 2023/0071125 A1    Mar. 9, 2023

(30) Foreign Application Priority Data

Sep. 7, 2021 (EP) ..................................... 21275125

(51) Int. Cl.
*B64D 11/04* (2006.01)
*B64D 11/00* (2006.01)

(52) U.S. Cl.
CPC .......... *B64D 11/04* (2013.01); *B64D 11/0007* (2013.01)

(58) Field of Classification Search
CPC ........................... B64D 11/004; B64D 11/0007
See application file for complete search history.

(56) References Cited

U.S. PATENT DOCUMENTS

| 9,821,911 B2 | 11/2017 | Wallbott et al. |
| 2005/0230540 A1 | 10/2005 | Harrington et al. |
| 2019/0031348 A1 | 1/2019 | Bajorat et al. |
| 2021/0047042 A1 | 2/2021 | Tracey et al. |
| 2022/0153329 A1 * | 5/2022 | Lange .................... B64D 11/04 |

FOREIGN PATENT DOCUMENTS

| DE | 102009000765 | 8/2010 | |
| DE | 102009000765 A1 * | 8/2010 | ........... B65H 75/403 |
| EP | 3778396 | 2/2021 | |
| WO | 20180177625 | 10/2018 | |

OTHER PUBLICATIONS

EPO, Extended European Search Report dated Feb. 16, 2022 in EP Serial No. 21275125.9.

* cited by examiner

*Primary Examiner* — Richard G Davis
(74) *Attorney, Agent, or Firm* — SNELL & WILMER L.L.P.

(57) ABSTRACT

A crank assembly for extracting an inner galley trolley from a galley bay is provided. The crank assembly comprises an output shaft configured to rotate about an axis of rotation A for actuating a trolley extraction mechanism to extract an inner galley trolley from a galley trolley bay; a crank arm configured to rotate about the axis of rotation A; a handle connected to the crank arm for rotating the crank arm about the axis of rotation A; and a clutch mechanism. The clutch mechanism is operable to selectively couple the crank arm to the output shaft to selectively transfer rotational movement of the crank arm into rotational movement of the output shaft.

17 Claims, 7 Drawing Sheets

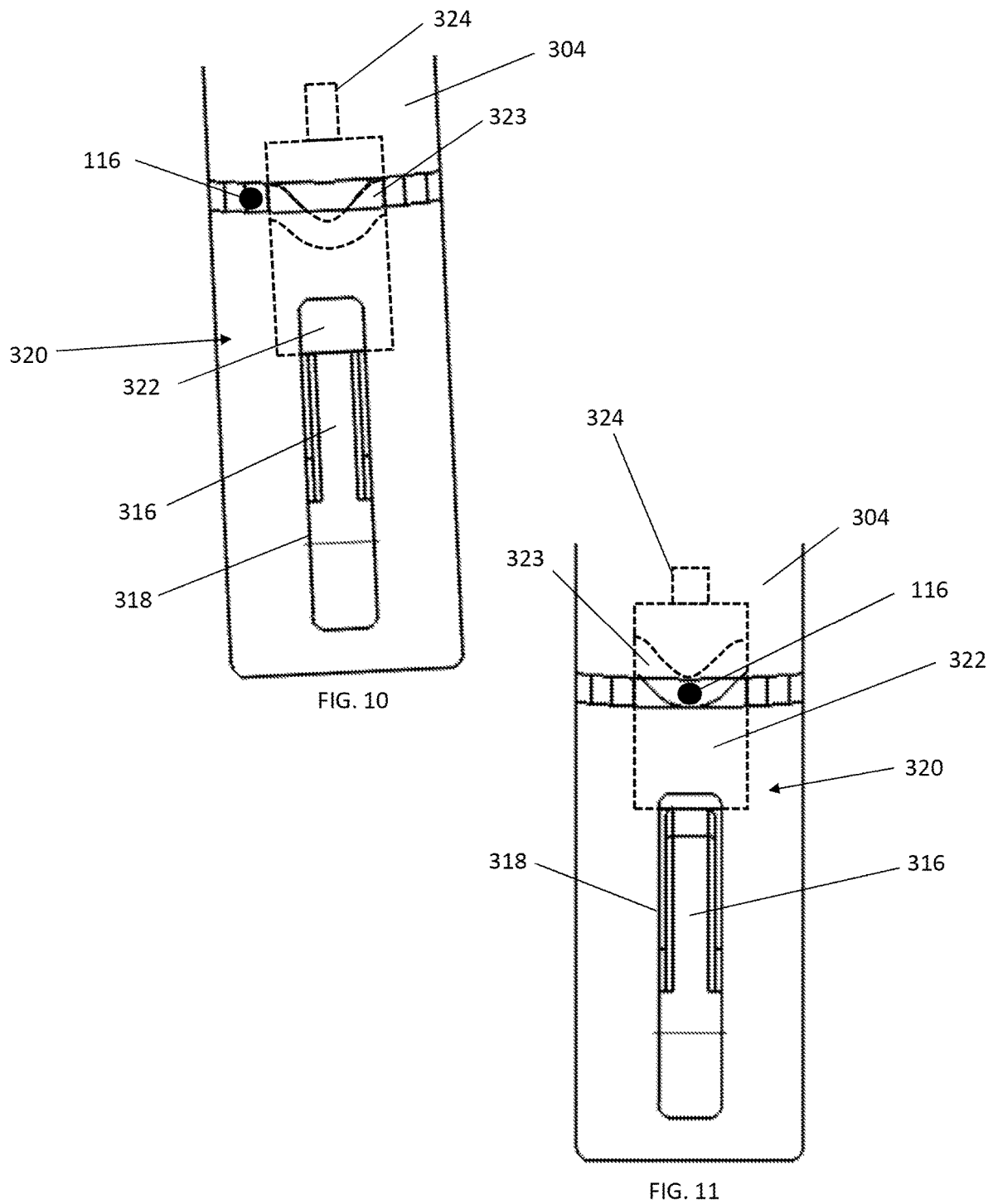

TROLLEY EXTRACTION DEVICE

CROSS-REFERENCE TO RELATED APPLICATIONS

This application claims priority to, and the benefit of, EP Patent Application No. EP21275125.9, filed Sep. 7, 2021 and titled "TROLLEY EXTRACTION DEVICE," which is incorporated by reference herein in its entirety for all purposes.

FIELD

The present disclosure relates to devices for extracting trolleys from trolley bays such as those found in the galleys of passenger aircraft.

BACKGROUND

Commercial passenger aircraft often feature galley areas where provisions such as food and drink are stored and prepared for in-flight consumption. These provisions are generally stored in wheeled trolleys that can be quickly loaded and unloaded during aircraft turnarounds and which can be wheeled around the cabin to serve passengers during a flight. Galley trolleys are generally stored in galley trolley bays, where they are restrained securely when not in use. When the contents of a trolley is required a cabin attendant can release the restraints and pulls the trolley out from the bay, e.g. using a handle on the front of the trolley.

To optimize the use of space in the galley, it has been proposed to use extended-depth galley trolley bays (e.g. up to 2 m deep or more) to store several galley trolleys one in front of the other. However, it can be difficult to extract inner trolleys (i.e. trolleys behind an outer trolley closest to the front of the bay) from such bays. For instance, a typical galley trolley is 1 m long, which means that the inner trolley(s) in the bay may be stored at least 1 m deep into the bay. This may prevent a cabin attendant from simply reaching into the bay to extract the inner trolley(s) in the normal way, especially as they can weigh more than 100 kg when fully loaded. An improved approach may be desired.

SUMMARY

A first aspect of the present disclosure is a crank assembly for extracting an inner galley trolley from a galley bay, the crank assembly comprising:
an output shaft configured to rotate about an axis of rotation for actuating a trolley extraction mechanism to extract an inner galley trolley from a galley trolley bay;
a crank arm configured to rotate about the axis of rotation;
a handle connected to the crank arm for rotating the crank arm about the axis of rotation; and
a clutch mechanism operable to selectively couple the crank arm to the output shaft to selectively transfer rotational movement of the crank arm into rotational movement of the output shaft.

It will be understood by those skilled in the art that the clutch mechanism allows a user to move the crank arm to a desired position without affecting the state of the output shaft. This may, for instance, facilitate the use of the crank assembly in space-limited implementations because a space-optimal stowed position of the crank assembly can be adopted without needing to compensate for associated movement of the output shaft (and, for instance, a trolley extraction mechanism actuated by the output shaft).

In a set of examples, the crank assembly is suitable for installing at the front of a galley trolley bay (e.g. on a front edge of a side wall of the galley bay), with the crank arm configured to move in front of the galley bay as it is rotated. In such examples it is advantageous to be able to return the crank arm to a stowed position in which it does not block the galley bay (e.g. aligned with a side wall of the galley bay) without actuating a trolley extraction mechanism any further, e.g. to avoid partially reversing a trolley extraction or stowage process. In some examples, it may be necessary to rotate the crank arm up to 180 degrees to return it to the stowed position, which could result in significant movement of a connected trolley extraction mechanism if the clutch mechanism did not allow the crank arm to be de-coupled from the output shaft.

The crank arm provides a mechanical advantage, reducing the amount of force required to be applied to the handle by a user to achieve a required torque (i.e. a torque required to actuate a trolley extraction device). In some examples, the crank arm extends substantially perpendicular to the axis of rotation to maximize the mechanical advantage.

The clutch mechanism may comprise any suitable operating mechanism for selectively coupling the crank arm to the output shaft, such as a friction clutch configured to selectively engage two high-friction surfaces attached to the crank arm to the output shaft respectively. The use of a friction clutch allows for continuous fine adjustment of the relative position of the crank arm and the output shaft. However, in a set of examples the clutch mechanism is a toothed clutch, i.e. comprising a first toothed member connected to the output shaft and a second corresponding toothed member connected to the crank arm. In such examples the first and second toothed members are engageable to transfer rotational movement of the crank arm into rotational movement of the output shaft. While the use of toothed members may limit relative adjustment of the crank arm and output shaft to discrete tooth positions, they can allow a physically small clutch mechanism to transmit very large torques (e.g. greater torques than an equivalently-sized friction clutch mechanism). This may be important in implementations such as aircraft where it is critical to reduce space and weight where possible.

In a toothed clutch mechanism, having a larger number of teeth generally allows for finer adjustments to the relative position of the output shaft and the crank arm. However, for a given overall size of clutch mechanism, increasing the number of teeth that are used may necessitate the use of smaller and thus weaker individual teeth that may not be capable of transmitting a required torque. In some examples, the first and/or second toothed member comprises at least three teeth, preferably at least five teeth and further preferably at least eight teeth. In various examples, the teeth of the first and/or second toothed members may be evenly spaced (e.g. evenly distributed around the axis of rotation of the output shaft).

In one set of examples, the clutch mechanism comprises eight teeth spaced evenly around the axis of rotation of the output shaft. This enables adjustment steps of 22.5° whilst still allowing the individual teeth to be large enough to have reasonable strength (e.g. sufficient strength to withstand the torque required to extract a fully laden galley trolley). The first and second toothed members may comprise different numbers of teeth, although it may be preferred for the first and second toothed members to have an equal number of teeth to maximize the distribution of torque over all possible teeth.

As mentioned above, the crank assembly may be particularly suitable for use in space-limited implementations. In some examples the crank assembly has a width perpendicular to the axis of rotation of the output shaft of less than 50 mm, e.g. less than 30 mm, less than 20 mm or even 16 mm or less.

The crank assembly may comprise an actuation member for operating the clutch mechanism, i.e. to couple the crank arm to the output shaft and/or to decouple the crank arm from the output shaft. The actuation member may be mechanically coupled to or formed as part of the crank arm. Thus, the crank arm may comprise an actuation member for operating the clutch mechanism. Using the crank arm to actuate the clutch mechanism may be particularly convenient for a user as it can provide a relatively large gripping area. Alternatively, the actuation member may be mechanically coupled to or formed as part of the output shaft.

The actuation member may comprise a pushable member (e.g. a button) configured to be pushed by a user to operate the clutch mechanism (e.g. to physically move a high friction surface or toothed member of the clutch mechanism that is coupled to the output shaft away from a corresponding surface or member coupled to the crank arm). Additionally or alternatively, the actuation member may comprise a pullable member configured to be pulled by a user to operate the clutch mechanism (e.g. to physically move a high friction surface or toothed member of the clutch mechanism that is coupled to the crank arm away from a corresponding surface or member coupled to the output shaft).

In some examples, the clutch mechanism comprises a biasing means (e.g. a spring) configured to bias the clutch mechanism. The clutch mechanism may be biased towards an engaged position in which the crank arm is coupled to the output shaft or a disengaged position in which the crank arm is not coupled to the output shaft. An actuation member may be operable by a user to disengage or engage the clutch mechanism respectively by overcoming the biasing means. The clutch mechanism is then returned to the engaged/disengaged position by the biasing means when the user releases the actuation member.

In some sets of examples the handle comprises a retractable handle movable between a deployed position and a retracted position. The handle can be used in the deployed position to facilitate rotating the crank arm and then moved to the retracted position when the crank assembly is not in used to save space. In some examples the handle is biased towards the deployed position or the retracted position (e.g. using a spring). For instance, the handle may be biased towards the retracted position so that releasing the handle after use automatically returns it to the retracted position.

In the deployed position the handle may extend from the crank arm in a direction substantially parallel to the axis of rotation of the output shaft, e.g. providing a convenient interface for a user to rotate the crank arm. The handle extending substantially parallel to the axis of rotation means that the orientation of the handle relative to the axis of rotation is substantially constant throughout each rotation, making it easier for a human operator to apply a tangential force to rotate the crank arm.

In some examples, in the retracted position the handle extends substantially parallel to the crank arm. For instance, the handle may be mounted to the crank arm via a hinge, allowing it to be swung between a deployed position (e.g. substantially parallel to the axis of rotation) and a retracted position parallel to the crank arm (e.g. substantially perpendicular to the axis of rotation). In the retracted position the handle may be housed at least partially within the crank arm, e.g. in a recess of the crank arm. This may allow the crank assembly to adopt a lower profile when not in use.

As explained above, the clutch mechanism facilitates moving the crank arm to be moved to a stowed position when not in use. To mitigate accidental operation of the crank assembly, in some examples the crank assembly comprises a locking mechanism for locking the crank arm in a stowed position. The locking mechanism may, for instance comprise a locking element (e.g. a projection or tooth) which is connected to the crank arm and is selectively engagable with a fixed structure (e.g. a recess in a wall of a galley trolley bay) when the crank arm is in a stowed position.

In some examples, the locking mechanism is comprised by the handle. In this or other examples the locking mechanism may be engaged by moving the handle into a retracted position. This may reduce the part count and/or complexity of the crank assembly compared to separate locking mechanisms. For instance, a hinged handle may comprise a locking projection configured to engage with a fixed structure (e.g. a wall of a galley trolley bay) when the handle is swung into the retracted position. The locking mechanism may be formed integrally with the rest of the handle. In one set of examples, the locking projection is configured to extend past or through the crank arm to engage with a fixed structure behind the crank arm when the handle is in the retracted position.

It may be important to avoid unintentional actuation of the locking mechanism when the crank assembly is in use (e.g. when the crank arm is being rotated), as this could cause damage to the crank assembly or a nearby structure. In some examples, the crank assembly comprises an alignment mechanism configured to prevent engagement of the locking mechanism unless the crank arm is in a stowed position (e.g. aligned with a wall of a galley trolley bay). This may prevent the locking mechanism from causing inconvenience or damage if it is engaged with the crank arm in another position.

In examples where the locking mechanism is comprised by the handle and is engaged by moving the handle into a retracted position, the alignment mechanism may simply prevent the handle from moving to the retracted position unless the crank arm is in the stowed position.

The alignment mechanism may comprise a shutter configured to block the locking mechanism from engaging unless the crank arm is in a stowed position. The shutter may be biased (e.g. with a spring) towards the closed position. The shutter may be lifted open (e.g. against a biasing force) as the crank arm passes the stowed position by a projection (e.g. a pin) on the fixed structure with which the locking mechanism is configured to engage. For instance, the shutter may comprise an inclined (e.g. curved) channel configured to engage with a projection on an external fixed structure corresponding to the stowed position of the crank arm. In such examples, as the crank arm passes the stowed position the projection travels in the inclined channel to lifts the shutter open.

The present disclosure extends to a galley trolley extraction device comprising:
   a trolley extraction mechanism for extracting an inner galley trolley from a galley trolley bay; and
   a crank assembly as disclosed herein, wherein rotation of the output shaft is configured to actuate the trolley extraction mechanism.

The trolley extraction mechanism may, for instance, comprise a lead screw suitable for coupling to an inner galley trolley (e.g. via a suitable bracket). In such examples the trolley extraction mechanism may be actuated by rotating the lead screw (i.e. by rotating the output shaft of the crank assembly). In such examples rotating the lead screw causes a coupled inner galley trolley to move backwards or forwards in the bay to extract and/or stow the trolley in the galley trolley bay.

In some examples the trolley extraction mechanism is also operable for stowing an inner galley trolley in a galley trolley bay. For instance, the trolley extraction mechanism may be actuated in reverse to stow a trolley. In examples where the trolley extraction mechanism may comprise a lead screw this may comprise rotating the lead screw in the opposite direction to that used for extraction.

It may not be practical to align exactly the axis of rotation of the output shaft with that of the trolley extraction mechanism (e.g. the axis of rotation of a lead screw). Therefore in some examples the trolley extraction device comprises a universal joint that joins the output shaft to the trolley extraction mechanism. The universal joint may facilitate small offsets in the axes of rotation of output shaft and the trolley extraction mechanism, which may allow the galley trolley extraction device to be installed in more restricted spaces.

The present disclosure also extends to a galley structure comprising:
 a galley trolley bay defined at least partially by a wall extending rearwards from a front edge, said galley trolley bay suitable for storing at least an outer galley trolley adjacent the wall at a front of the galley trolley bay and an inner galley trolley adjacent the wall and behind the outer galley trolley; and
 a trolley extraction device as disclosed herein configured to extract an inner galley trolley from the galley trolley bay;
 wherein the crank assembly of the trolley extraction device is disposed at the front edge of the wall with the axis of rotation of the output shaft extending parallel to the wall.

In some examples the galley structure comprises a passenger aircraft galley structure. In some examples, the galley trolley bay comprises an extended-depth galley trolley bay, i.e. suitable for storing several standard-size galley trolleys (e.g. each 1 m long) in front of each other. In one example the galley trolley bay comprises a double-depth bay. The galley trolley bay may have a depth of at least 1.5 m, e.g. 2 m or more.

The crank assembly preferably has a width (i.e. in a direction perpendicular to the axis of rotation of the output shaft) that is narrower than the front edge of the wall. In other words, the crank assembly preferably does not protrude in front of the galley trolley bay when it is in a stowed position. The trolley extraction device may be housed at least partially within the wall, e.g. to save space in the galley bay itself Features of any aspect or example described herein may, wherever appropriate, be applied to any other aspect or example described herein. Where reference is made to different examples, it should be understood that these are not necessarily distinct but may overlap.

BRIEF DESCRIPTION OF THE DRAWINGS

One or more non-limiting examples will now be described, by way of example only, and with reference to the accompanying figures in which:

FIG. 10 is a rear view of the crank assembly showing the alignment mechanism in the closed position; and FIG. 11 is a rear view of the crank assembly showing the alignment mechanism in the open position.

DETAILED DESCRIPTION

Figure 1:
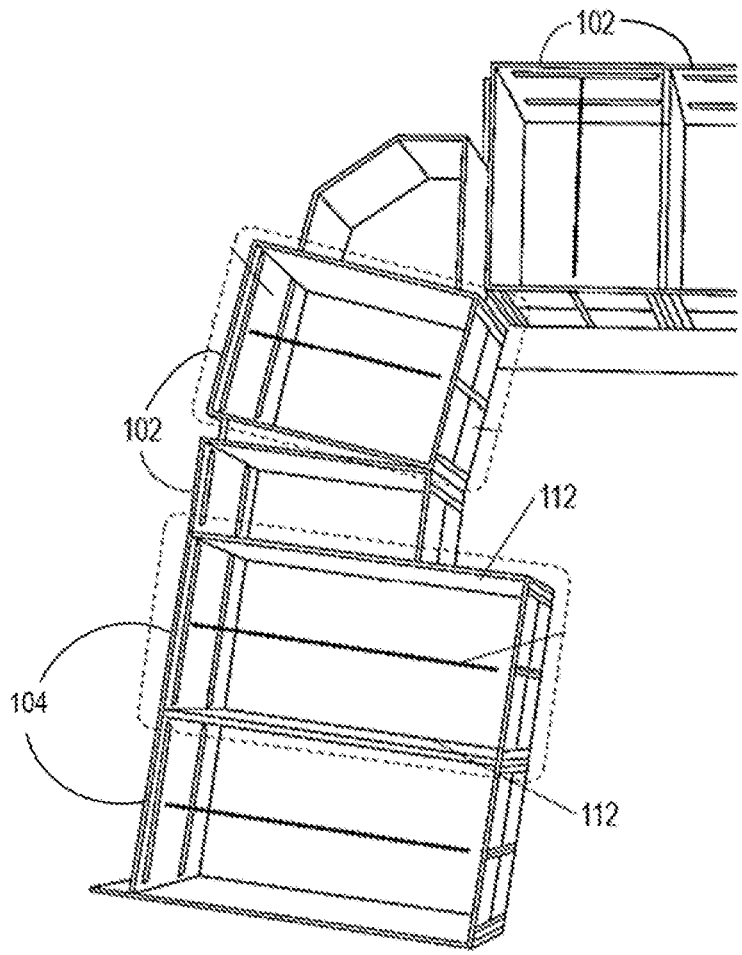
FIG. 1 is an overhead view of an aircraft galley structure according to an example of the present disclosure.
Figure 2:
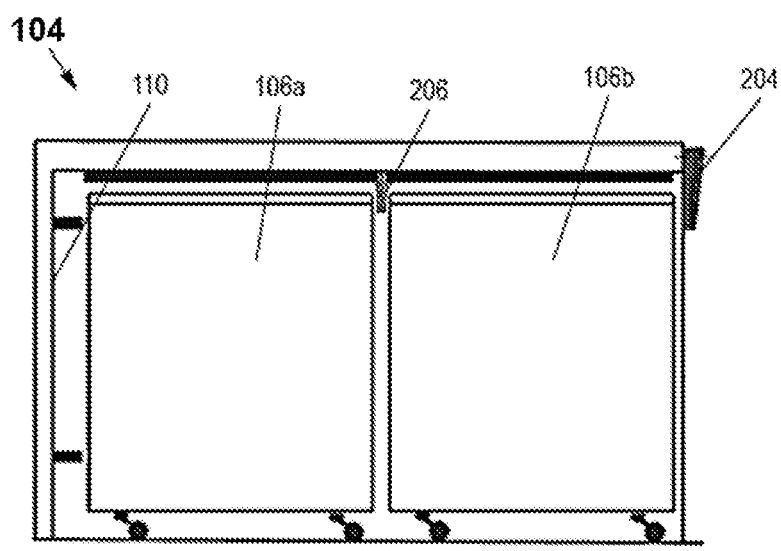
FIGS. 2-4 are various views of a double-depth galley trolley bay within the galley structure.

FIG. 1 shows an aircraft galley structure 100 comprising a plurality of single-depth galley trolley bays 102 along with two double-depth galley trolley bays 104. Each of the double-depth galley trolley bays 104 is defined by two side walls 112 on either side of the bay. One of the double-depth galley trolley bays 104 is shown from a side view in FIG. 2.

The double-depth trolley bay 104 houses an inner galley trolley 106a at the rear of the bay 104 and an outer galley trolley 106b at the front of the bay 104. The trolley bay features an outer retaining mechanism 204 and an inner retaining mechanism 206, which comprise rotatable latches for retaining the outer inner trolley 106a and inner trolley 106b respectively. The retaining mechanisms 204, 206 prevent the trollies 106a, 106b from rolling out of the bay 104 when they are not in use.

Figure 3:
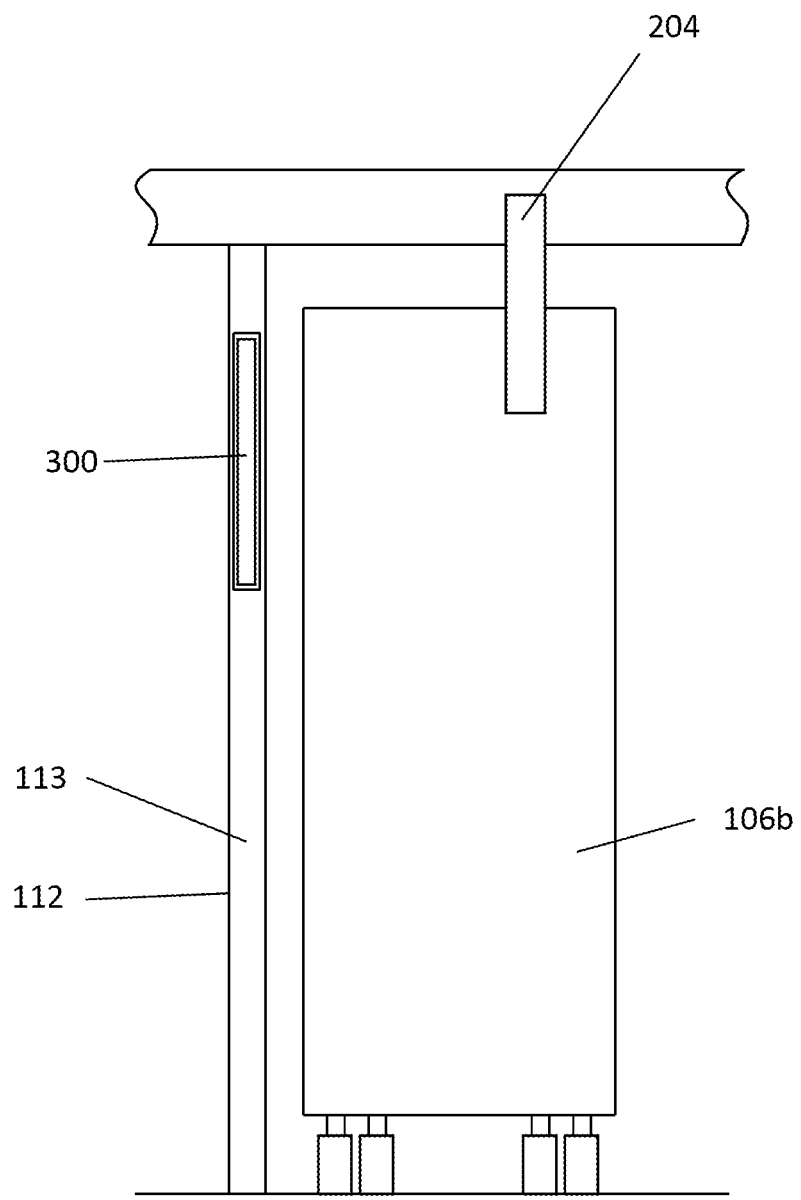

FIG. 3 is a front view of the double-depth trolley bay 104, showing the outer galley trolley 106b along with the outer retaining mechanism 204. This view shows a crank assembly 300 located on the front edge 113 of the side wall 112. As explained below, the crank assembly 300 can be used to extract the inner galley trolley 106a from the trolley bay 104. In FIG. 3 the crank assembly 300 is shown in a stowed position where it is aligned with the side wall 112. The crank assembly 300 has a width that is narrower than the front edge 113 such that it does not obstruct the extraction and replacement of the outer galley trolley 106b when in the stowed position.

Figure 4:
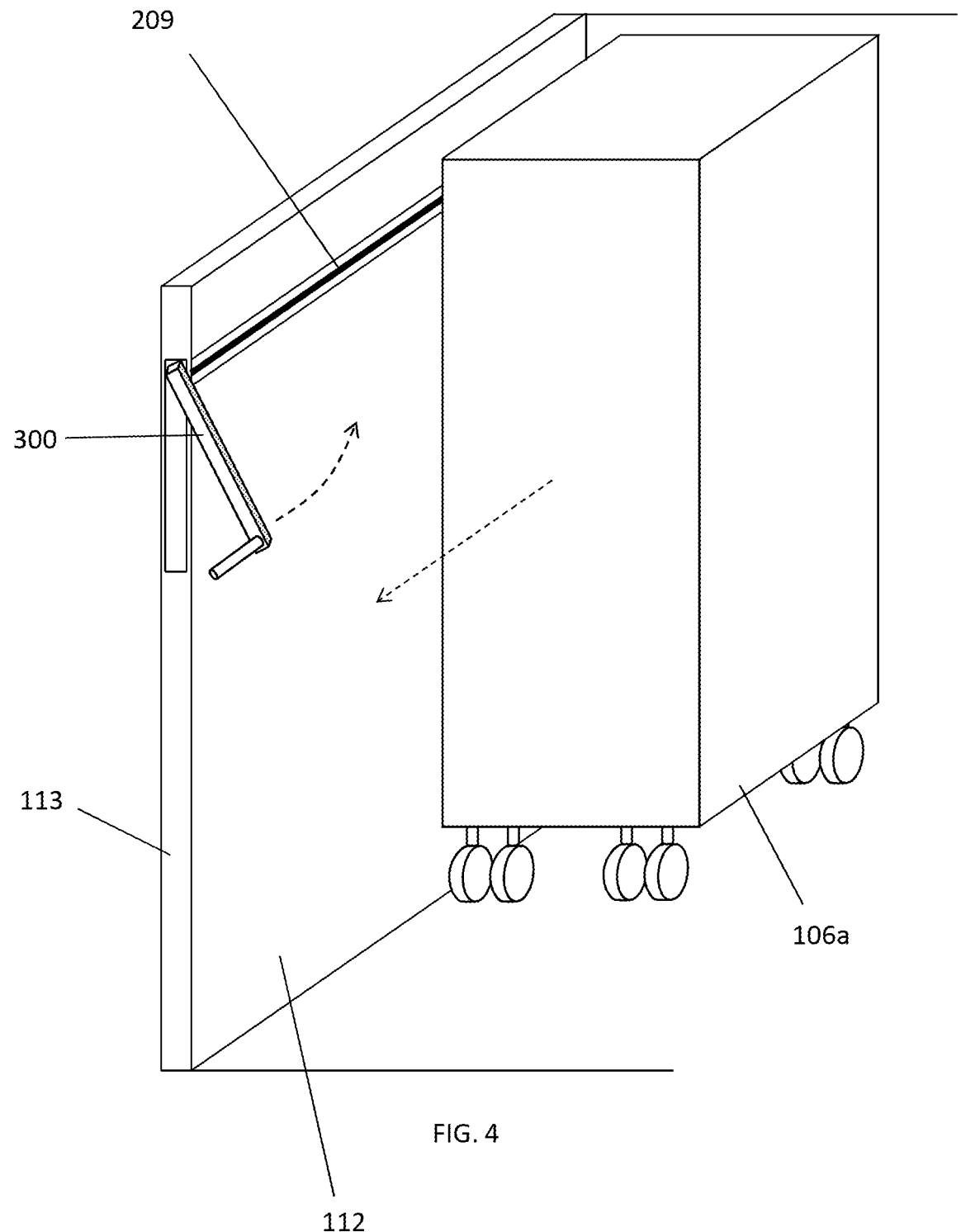

FIG. 4 shows the double-depth trolley bay 104 with the outer trolley 106b removed, and the crank assembly 300 being used to extract the inner galley trolley 106a. The crank assembly 300 is coupled to a trolley extraction mechanism 208 that, when rotated, pulls the inner galley trolley 106a out of the trolley bay 104. In this example the trolley extraction mechanism 208 comprises a lead screw 209 connected to a bracket (not shown) that engages with the inner galley trolley 106a. As the lead screw 209 is rotated using the crank assembly 300, it draws the bracket towards the front of the galley bay 104 to extract the inner trolley 106a.

Because the crank assembly 300 is located on the front edge 113 of the side wall 112, a user does not need to reach into the double-depth bay 104 to extract the inner trolley 106a. Furthermore, rotating the crank assembly 300 to extract the inner trolley 106a may require less force than simply pulling on the trolley 106a, making trolley extraction even more convenient. FIG. 4 shows how the crank assembly 300 protrudes in front of the opening of the trolley bay 104 as it is rotated to extract the inner trolley 106a.

Figure 5:
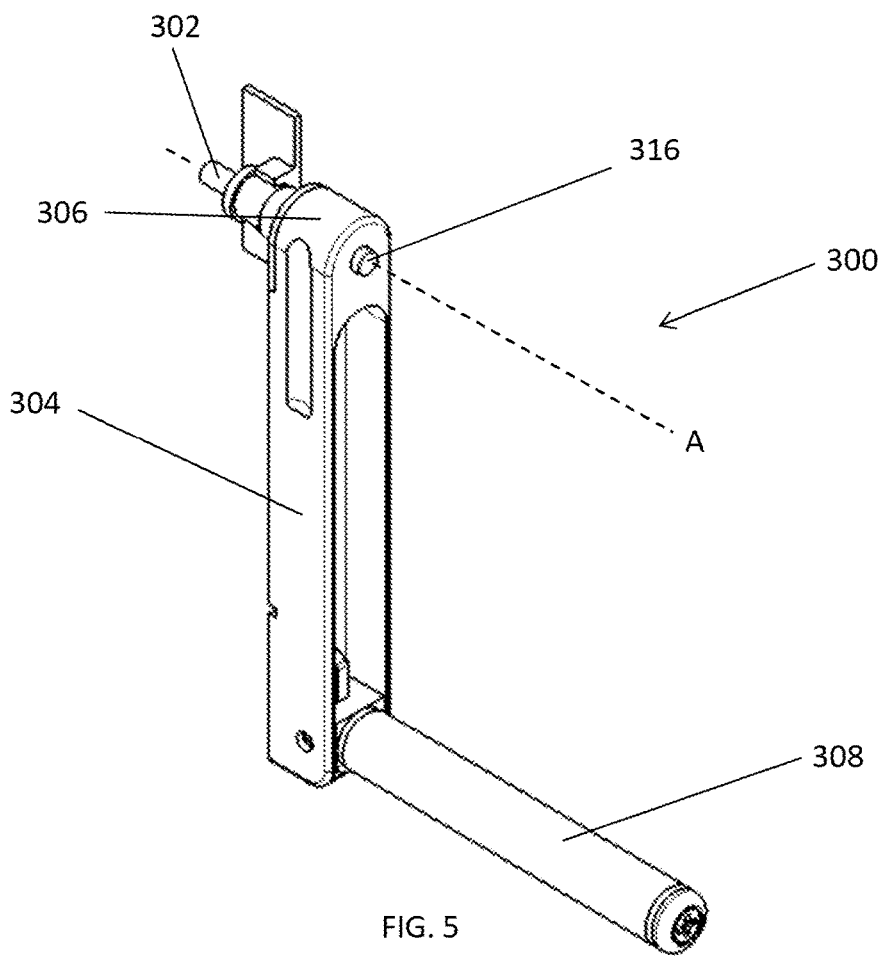
FIG. 5 is a detailed view of a crank assembly according to an example of the present disclosure with the handle deployed.

FIG. 5 shows the crank assembly 300 in more detail. The crank assembly 300 comprises an output shaft 302, a crank arm 304, a clutch mechanism 306 and a handle 308. The output shaft 302 is configured to rotate about an axis of rotation A to actuate the trolley extraction mechanism 208 (e.g. by rotating the lead screw 209). The crank arm 304 extends away from the axis of rotation A, producing a mechanical advantage which reduces the force required to actuate the trolley extraction mechanism 208.

The handle 306 extends from the distal end of the crank arm 304 and provides a convenient interface for a user rotating the crank arm 304. The handle 306 extends from the crank arm roughly parallel with the axis of rotation A which means that its orientation relative to the axis A does not change throughout a rotation of the crank arm 304.

To extract the inner trolley 106a from the trolley bay 104, a user releases the inner retaining mechanism 206 and rotates the crank arm 304 using the handle 306. To stow the trolley 106a the same procedure is followed in reverse. Once the trolley 106a has been removed or stowed, the crank arm 304 must be returned to the stowed position shown in FIG. 3 aligned with the side wall 112, to avoid obstructing the galley trolley bay 104 (or whatever is adjacent the galley trolley bay 104). As explained below, the clutch mechanism 306 allows the position of the crank arm 304 to be adjusted without rotating the output shaft 302. This allows the crank arm 304 to be returned to the stowed position without applying any rotation to the trolley extraction mechanism 208, i.e. avoiding undesired further movement of the trolley 106a.

Figure 6:
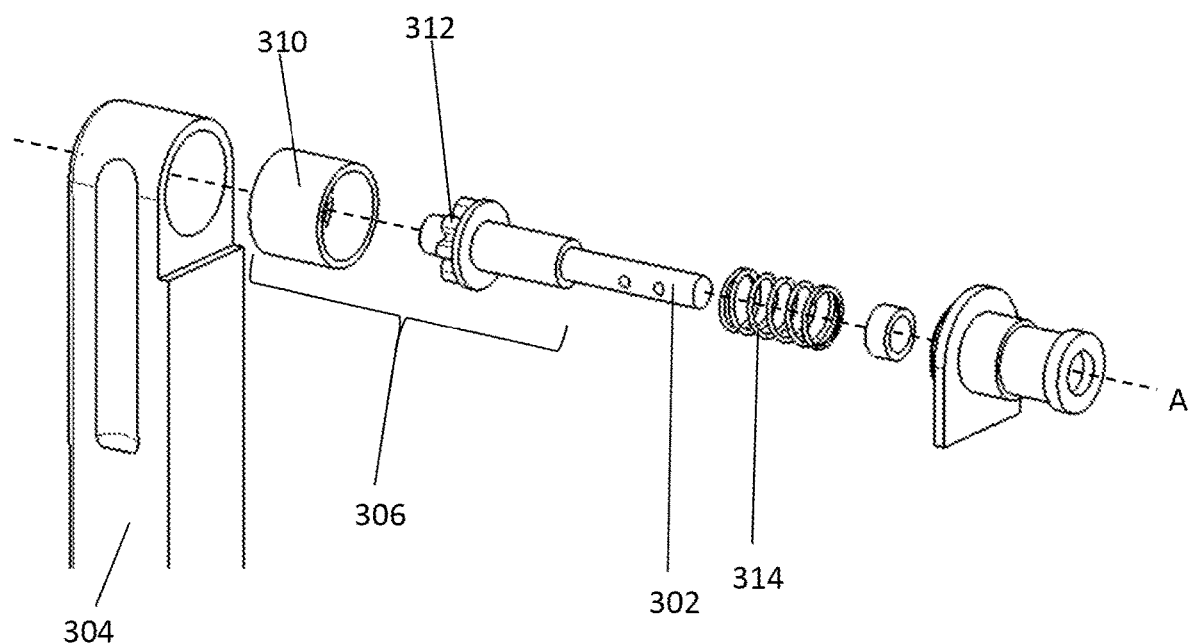
FIG. 6 is an exploded partial view of the crank assembly.

FIG. 6 shows an exploded view of the clutch mechanism 306. The clutch mechanism 306 comprises a female-toothed portion 310 fixed to the crank arm 304 and a corresponding male-toothed portion 312 fixed to the output shaft 302. A spring 314 is configured to bias the female-toothed portion 310 towards the male toothed-portion 312 so as to engage the teeth and couple the crank arm 304 to the output shaft 302. In this example the female-toothed portion 310 and the male toothed portion 312 each comprise eight evenly spaced teeth. This allows In the example shown in FIG. 6, a narrow central section of the male-toothed portion 312 extends through the female-toothed portion 310 and projects out of the front of the crank arm 304 as a small button 316 (shown in FIG. 5). To disengage the clutch mechanism 306, a user presses in the button 316 against the biasing force of the spring 314 to disengage the teeth of the male-toothed portion 312 from the female-toothed insert 310. This decouples the crank arm 304 from the output shaft 302, allowing a user to rotate the crank arm 304 to a desired position (e.g. a stowed position) without rotating the output shaft 302. Once the crank arm 304 is in its desired position (or within 22.5° of its desired position where eight teeth are used), the user releases the button 316 to reengage the clutch mechanism 306.

In another example, the clutch mechanism 306 is disengaged by a user pulling the crank arm 304 (and thus female-toothed insert 310) outwards to overcome the bias force of the spring 314 and disengage the teeth of the male-toothed portion 312 from the female-toothed insert 310. In this example one or more additional components are used to transfer a pulling force on the crank arm 304 to the rear of the spring 314.

Figure 7:
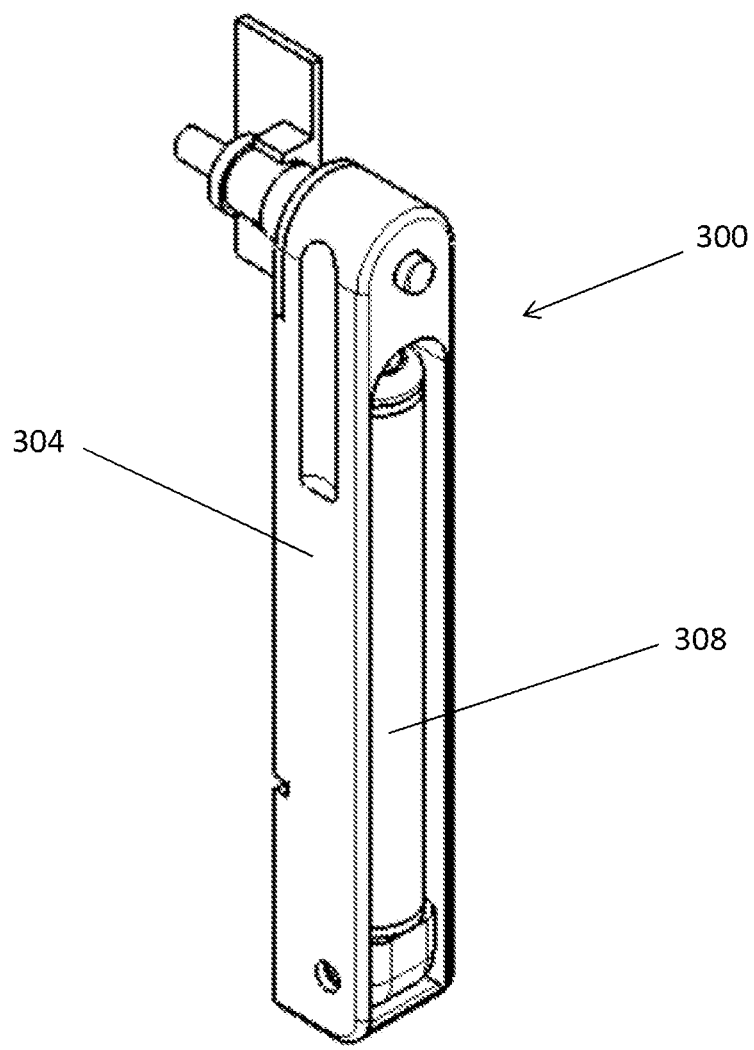
FIG. 7 shows the crank assembly of FIG. 5 with the handle retracted.

To reduce the profile of the crank assembly 300 when not in use, the handle 308 of the crank assembly 308 is configured to fold into the crank arm 304. FIG. 5 shows the handle 308 in the operational position, and FIG. 7 shows the handle 308 in the stowed position.

Figure 8:
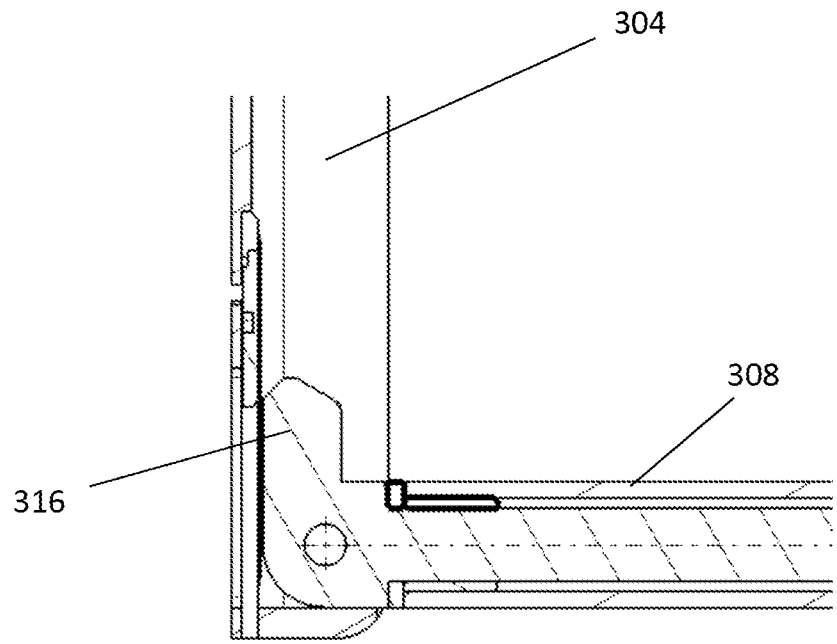
FIGS. 8 and 9 are close-up views of a handle of the crank assembly.
Figure 9:
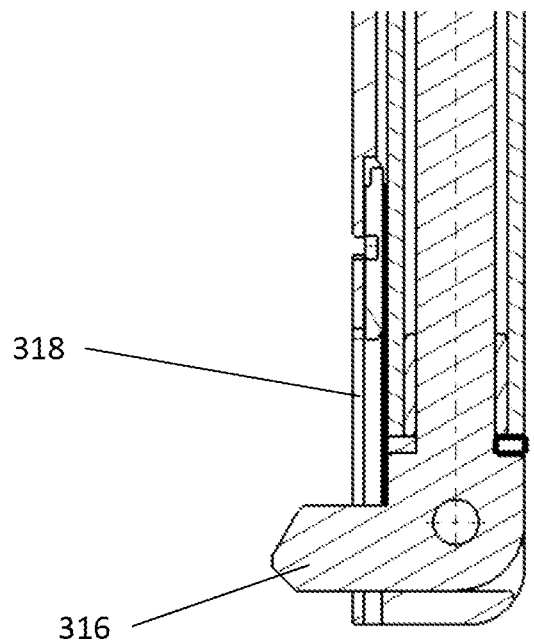

The crank assembly 300 comprises a locking mechanism 316, shown in FIGS. 8 and 9. The locking mechanism 316 is used to lock the crank arm 304 in a stowed position to prevent its accidental operation.

The locking mechanism 316 comprises a tooth that is formed as an integral part of the handle 308. The locking mechanism 316 extends perpendicularly to the rest of the handle 308. As such, when the when the handle 308 is in the operational position (as shown in FIG. 8), the locking mechanism 316 is located within the crank arm 304 in an unlocked position. However, when the crank arm 304 is in the stowed position and the handle 308 is moved to its stowed position within the crank arm 304 (as shown in FIG. 9), the locking mechanism 316 protrudes through an opening 318 in the rear of the crank arm 304 to adopt a locked position. In this position, the locking mechanism 316 engages with a corresponding slot in the side wall 112 to prevent the crank arm 304 from rotating.

Because the locking mechanism 316 protrudes out of the rear of the crank arm 304 when it is engaged, it is important to ensure that it cannot be moved to the locking position when the crank arm 304 is not in the stowed position (i.e. when it is being used to actuate the trolley extraction mechanism 208) because it could then cause damage to the crank assembly 300 or another structure such as the wall 112. The crank assembly 300 thus comprises an alignment mechanism 320, which will now be described with reference to FIGS. 10-11.

The alignment mechanism 320 is positioned at the rear of the crank arm 304 and comprises a shutter 322 configured to block the opening 318, and a spring 324 that biases the shutter 322 towards the blocked position. The shutter 322 comprises a curved channel 323 which is configured to engage with a corresponding pin 116 fixed to the side wall 112. The pin 116 is aligned vertically with the slot in the side wall 112 with which the locking mechanism 316 engages.

FIG. 10 shows the alignment mechanism 320 in the closed position (i.e. with the opening 318 blocked). In this scenario, the crank arm 304 is away from the stowed position (e.g. it is being rotated to actuate the trolley extraction mechanism 208). The pin 116 is thus not engaged with the curved channel 323 of the shutter 322 and the spring 324 pushes the shutter 322 into the closed position. The opening 318 is blocked and the locking mechanism 316 cannot be engaged (i.e. the handle 308 cannot be swung into the stowed position). This prevents accidental engagement of the locking mechanism 316 during use which may cause damage.

FIG. 11 shows the alignment mechanism 320 in the open position (i.e. with the opening 318 unblocked). When the crank arm 304 is moved to the proper stowed position aligned with the side wall 112, the pin 116 engages the curved channel 323 of the shutter and pulls it upward, overcoming the biasing force of the spring 324 and unblocking the opening 318. The handle 308 can now be swung into the stowed position, engaging the locking mechanism 316 and preventing further movement of the crank arm 304.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of the disclosure. Additionally, while various examples of the disclosure have been described, it is to be understood that aspects of the disclosure may include only some of the described examples. Accordingly, the disclosure is not to be seen as limited by the foregoing description, but is only limited by the scope of the appended claims.

The invention claimed is:

1. A crank assembly for extracting an inner galley trolley from a galley bay, the crank assembly comprising:
   an output shaft configured to rotate about an axis of rotation for actuating a trolley extraction mechanism to extract the inner galley trolley from the galley trolley bay;
   a crank arm configured to rotate about the axis of rotation;
   a handle connected to the crank arm for rotating the crank arm about the axis of rotation;
   a clutch mechanism operable to selectively couple the crank arm to the output shaft to selectively transfer rotational movement of the crank arm into rotational movement of the output shaft; and
   an actuation member for operating the clutch mechanism, wherein the actuation member is configured to enable the crank arm to transfer rotational movement to the output shaft in a first direction for forward movement of the trolley and in a second direction for reverse movement of the trolley.

2. The crank assembly of claim 1, wherein the clutch mechanism comprises a first toothed member connected to the output shaft and a second corresponding toothed member connected to the crank arm.

3. The crank assembly of claim 2, wherein the first and/or second toothed member comprises eight teeth spaced evenly around the axis of rotation of the output shaft.

4. The crank assembly of claim 1, comprising a width perpendicular to the axis of rotation of the output shaft of less than 50 mm.

5. The crank assembly of claim 1, wherein the crank arm comprises the actuation member.

6. The crank assembly of claim 1, comprising a biasing means configured to bias the clutch mechanism towards an engaged position in which the crank arm is coupled to the output shaft.

7. The crank assembly of claim 1, wherein the handle comprises a retractable handle movable between a deployed position and a retracted position.

8. The crank assembly of claim 7, wherein the handle is housed at least partially within the crank arm when in the retracted position.

9. The crank assembly of claim 1, comprising a locking mechanism for locking the crank arm in a stowed position.

10. The crank assembly of claim 9, wherein the locking mechanism comprises a locking element connected to the crank arm and selectively engageable with a fixed structure when the crank arm is in the stowed position.

11. The crank assembly of claim 9, wherein the locking mechanism may be engaged by moving the handle into a retracted position.

12. The crank assembly of claim 9, comprising an alignment mechanism configured to prevent engagement of the locking mechanism unless the crank arm is in the stowed position.

13. The crank assembly of claim 1, comprising a width perpendicular to the axis of rotation of the output shaft of less than 30 mm.

14. The crank assembly of claim 1, wherein the actuation member is operated by a user.

15. A galley trolley extraction device comprising:
   a trolley extraction mechanism for extracting an inner galley trolley from a galley trolley bay; and
   a crank assembly as claimed in any preceding claim, wherein rotation of the output shaft is configured to actuate the trolley extraction mechanism.

16. A galley structure comprising:
   a galley trolley bay defined at least partially by a wall extending rearwards from a front edge, said galley trolley bay suitable for storing at least an outer galley trolley adjacent the wall at a front of the galley trolley bay and an inner galley trolley adjacent the wall and behind the outer galley trolley; and
   a trolley extraction device as claimed in claim 15 configured to extract an inner galley trolley from the galley trolley bay;
   wherein the crank assembly of the trolley extraction device is disposed at the front edge of the wall with the axis of rotation of the output shaft extending parallel to the wall.

17. The galley structure of claim 16, wherein the galley structure comprises a passenger aircraft galley structure.

* * * * *